(12) United States Patent
Tarjan et al.

(10) Patent No.: US 7,680,641 B1
(45) Date of Patent: Mar. 16, 2010

(54) IDENTIFYING A MINIMUM CUT AND/OR A MAXIMUM FLOW USING BALANCING OF VERTEX EXCESSES

(75) Inventors: Robert E. Tarjan, Princeton, NJ (US); Bin Zhang, Fremont, CA (US); Yunhong Zhou, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 828 days.

(21) Appl. No.: 11/450,706

(22) Filed: Jun. 9, 2006

(51) Int. Cl.
*G06F 17/50* (2006.01)
(52) U.S. Cl. ..................................................... 703/13
(58) Field of Classification Search .................... 703/13
See application file for complete search history.

(56) References Cited

U.S. PATENT DOCUMENTS

| | | | |
|---|---|---|---|
| 5,222,235 A | 6/1993 | Hintz et al. | |
| 5,680,573 A | 10/1997 | Rubin et al. | |
| 5,797,000 A | 8/1998 | Bhattacharya et al. | |
| 5,842,208 A | 11/1998 | Blank et al. | |
| 6,675,170 B1 | 1/2004 | Flake | |
| 6,999,420 B1 * | 2/2006 | Chiu et al. | 370/231 |
| 2001/0013087 A1 | 8/2001 | Ronstrom | |
| 2008/0071590 A1 | 3/2008 | Zhang et al. | |
| 2008/0086446 A1 | 4/2008 | Zhang et al. | |
| 2008/0218518 A1 | 9/2008 | Zhou et al. | |

OTHER PUBLICATIONS

D. Hochbaum, "The Pseudoflow Algorithm and the Pseudoflow-Based Simplex for the Maximum Flow Problem," Proceedings of 6th International Conference on Integer Programming and Combinatorial Optimization, pp. 325-337 (Jun. 1998).
http:\\magma.maths.usyd.edu.au/magma/htmlhelp/text1417.htm, "Maximum Flow and Minimum Cut," pp. 1-7 (at least as early as Nov. 17, 2005).
http:\\128.32.125.151/riot/Applications/WeightedMinCut/, "The Minimum/Maximum Cut Problem," pp. 1-3 (at least as early as Nov. 17, 2005).
http://mathworld.wolfram.com/MaximumFlowMinimumCut-Theorem.html, "Maximum Flow, Minimum Cut Theorem," p. 1 (at least as early as Nov. 27, 2005).
http://people.brunel.ac.uk/ mastjjb/jeb/or/netflow.html, "OR-Notes," pp. 1-14 (at least as early Nov. 17, 2005).
http://mathworld.wolfram.com/NetworkFlow.html, "Network Flow," pp. 1-2 (at least as early as Nov. 17, 2005).
B. Zhang et al., "A Simultaneous Parametric Maximum-Flow Algorithm for Finding the Complete Chain of Solutions," pp. 1-15, Oct. 25, 2004.
B. Zhang et al., "Simultaneous Parametric Maximum Flow Algorithm with Vertex Balancing," pp. 1-8, Jun. 28, 2005.

(Continued)

*Primary Examiner*—Paul L Rodriguez
*Assistant Examiner*—Eunhee Kim

(57) ABSTRACT

A representation of a network having vertices connected by arcs is provided, where the network exhibits a pseudoflow. Arcs on which moves are to be performed are iteratively chosen for balancing excesses of vertices across the arcs until a stopping rule is satisfied. After the stopping rule is satisfied, further processing is performed to identify at least one of a minimum cut and/or maximum flow.

19 Claims, 5 Drawing Sheets

OTHER PUBLICATIONS

B. Zhang et al., "A Simultaneous Maximum Flow Algorithm for the Selection Model," pp. 1-6, May 13, 2005.

B. Zhang et al., U.S. Appl. No. 11/048,301, entitled System and Method for Selecting a Portfolio, filed Jan. 30, 2005, pp. 1-22, Fig. 1-4.

B. Zhang et al., U.S. Appl. No. 11/159,454, entitled "Determination of a State of Flow Through or a Cut of a Parameterized Network," filed Jun. 22, 2005, pp. 1-24, Fig. 1-6.

Zhang et al, U.S. Appl. No. 11/340,081, entitled "Determing and Amount of Flow Through, or a Cut of, a Parameterized Network," filed Jan. 25, 2006 pp. 1-23, Figs. 1-7.

Tarjan, et al, U.S. Appl. No. 11/450,706, entitled "Identifying a Minimum Cut and/or a Maximum Flow Suing Balancing of Vertex Excesses," Filed Jun. 9, 2008, pp. 1-24, Figs. 1-5.

U.S. Appl. No. 11/543,494, Office Action dated Dec. 11, 2008, pp. 1-26 with attachements.

U.S. Appl. No. 11/543,494, Office Action dated Jun. 24, 2008, pp. 1-23 with attachements.

J.W.J. Williams, "Algorithm 232 Heapsort," Communications of the ACM, vol. 7, No. 6, pp. 347-349 (Jun. 1964).

J. Misra et al., "A Constructive Proof of Vizing's Theorem," Information Processing Letters 41(3), pp. 131-133 (Sep. 1990).

A. Goldberg et al., "Beyond the Flow Decomposition Barrier," Journal of ACM, 45(5), pp. 783-797 (Sep. 1998).

B.V. Cherkassky et al., "On Implementing Push-Relabel Method for the Maximum Flow Problem," Algorithmica 19(4), pp. 390-410 (Sep. 1994).

D.D. Sleator et al., "A Data Structure for Dynamic Trees," Journal of Computer and System Sciences, vol. 26, No. 3, pp. 362-391 (Jun. 1983).

A. Goldberg et al., "Finding Minimum-Cost Circulations by Successive Approximation," Mathematics of Operations Research, vol. 15, No. 3, pp. 430-465 (Aug. 1990).

A.V. Goldberg et al., "A New Approach to the Maximum-Flow Problem," Journal of the Association for Computing Machinery, vol. 35, No. 4, pp. 921-940 (Oct. 1988).

* cited by examiner

IDENTIFYING A MINIMUM CUT AND/OR A MAXIMUM FLOW USING BALANCING OF VERTEX EXCESSES

BACKGROUND

A network of nodes and edges that connect the nodes can be used to represent various types of systems, such as communications systems, hydraulic systems, transportation systems, and so forth, which involve flow of some type of quantity from node to node through conduits having specified capacities. A network can also represent the flow of monetary amounts between nodes that represent products or services, where the monetary amounts can represent profit, revenue, or expense. Such networks can be analyzed for the purpose of solving an optimization problem, which involves finding the maximum flow between at least a source and at least a sink that are coupled by the nodes of the network as fast as possible. The analysis involves identifying the "minimum cut" and/or the "maximum flow" through the network.

Conventionally, identifying the minimum cut of and/or the maximum flow through a network is often time-consuming and computationally expensive, particularly when analyzing very large networks. Conventional algorithms for computing the maximum flow and/or minimum cut of a network are often relatively complex.

BRIEF DESCRIPTION OF THE DRAWINGS

Some embodiments of the invention are described with respect to the following figures.

DETAILED DESCRIPTION

Figure 1:
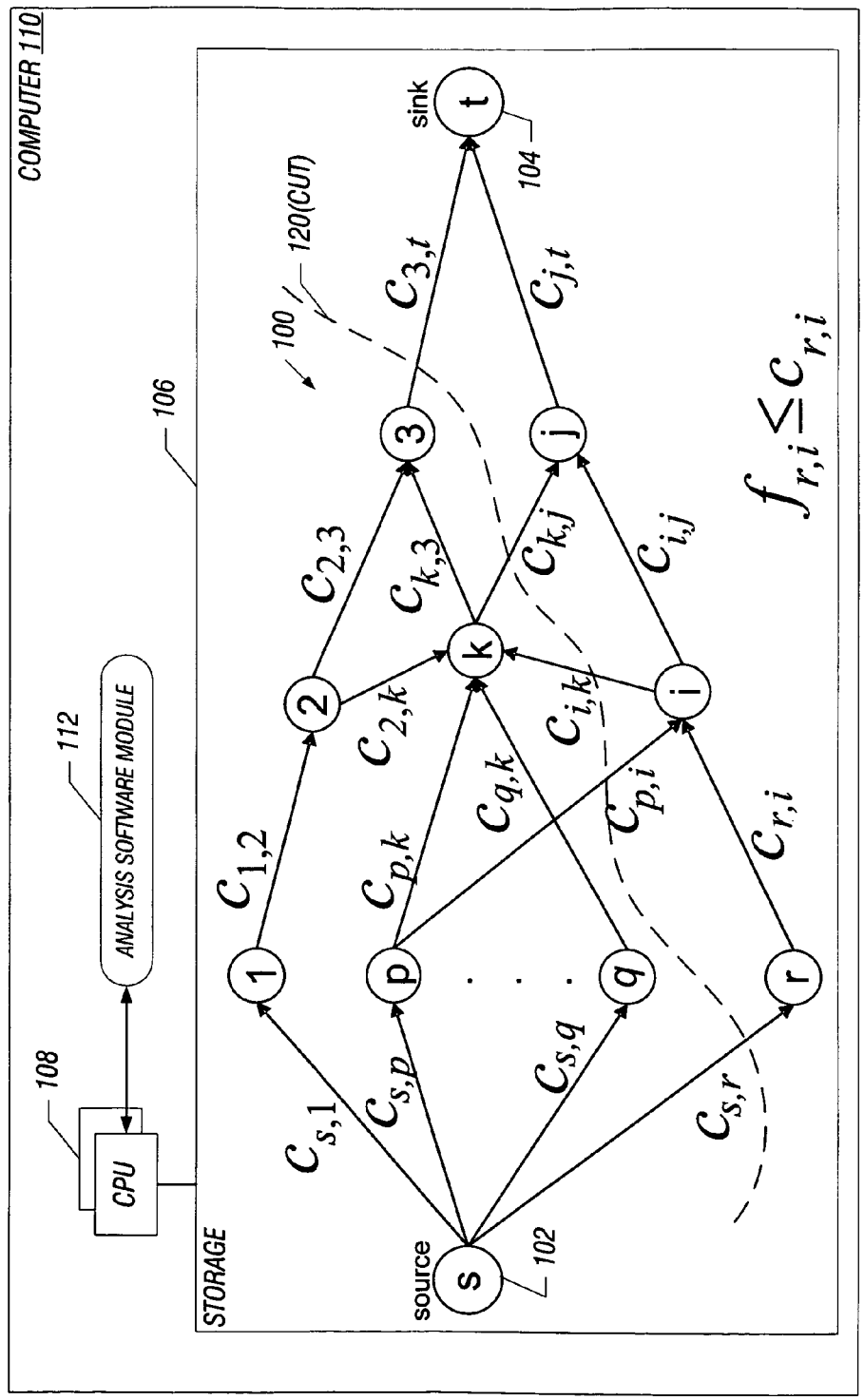
FIG. 1 is a block diagram of a computer that stores a representation of an example network that may be analyzed according to some embodiments of the invention.

FIG. 1 is a block diagram of an example computer 110 that has a storage 106 for storing a representation of a flow network 100 (or more simply, network 100) having intermediate nodes 1, 2, 3, p, k, q, r, i, j, that interconnect a source node 102 and a sink node 104. The network 100 can represent various types of systems, including network systems, computer systems, transportation systems, hydraulic systems, communications systems, financial systems, and so forth. Nodes in the network represent various different types of network elements, such as processing elements, storage elements, switching or routing elements, financial nodes, transportation nodes, and so forth. Quantities (which can represent amounts of data or things; monetary amounts such as profit, revenue, and costs; amounts related to performance of services; and other amounts) flow from the source node 102 to the sink node 104 through intermediate nodes and conduits connecting the source node 102, intermediate nodes, and sink node 104. Computations relating to network flows can be used for various applications, such as scheduling for transportation networks, routing of packets in a communications network, scheduling machinery and crew for construction projects, managing energy in a power network, performing protein classification, and so forth.

In some embodiments, the network 100 of FIG. 1 is a "capacitated network." A "capacitated network" is represented by a directed graph G=(V, A) with two distinguished vertices, a "source" s and a "sink" t (represented as nodes 102 and 104, respectively, in FIG. 1), along with a non-negative "capacity function" c on the arcs in the set of arcs A. V represents the set of vertices, including the source and sink vertices as well as intermediate vertices. A "vertex" refers to a node of the graph representing a network, such as the network of FIG. 1. In the example network 100 of FIG. 1, G represents the network, V represents the set of nodes, and A represents the set of arcs interconnecting the nodes. The terms "vertex" and "node" are used interchangeably. For this discussion, it is assumed that the graph G is "symmetric"; in other words, (v,w) (conduit from vertex v to vertex w) is an arc if and only if (w,v) is also an arc. The pair of arcs (v,w), (v,w) is sometimes referred to as an "edge" {v,w}. If an arc has sufficient capacity, then quantities can flow over the arc from one vertex to another vertex.

A non-symmetric network can be made symmetric without affecting the maximum flow problem by adding an arc (w,v) with zero capacity for each arc (v,w) whose reversal (w,v) is not originally present. It is assumed (without loss of generality) that arcs into the source and out of the sink have zero capacity.

In the discussion below, n denotes the number of vertices in the set of vertices V, m denotes the number of arcs in the set of arcs A, and U denotes the maximum arc capacity, assuming that arc capacities are all integers.

In some embodiments, a "pseudoflow" on the graph G is a real-valued function f on the arcs that is antisymmetric: $f(v,w) = -f(w,v)$ for every arc (v,w), and obeys the following capacity constraints: $f(v,w) \leq c(v,w)$ for every arc (v,w) (flow f on the arc is less than the capacity c). A pseudoflow is not a flow since it exhibits the following characteristic: an amount flowing into a vertex v ($\neq$s, t) may be different from the amount coming out of the vertex. Such a network is said to exhibit a pseudoflow. This is contrasted with a flow where the amount flowing into any vertex v ($\neq$s, t) is equal to the amount coming out of the vertex v. Generally, a network exhibits a pseudoflow if an amount of flow into the network (or any subset of the network) exceeds or is less than an amount of flow out of the network (or any subset of the network).

The quantity f(v,w) represents a net flow from vertex v to vertex w. Given a pseudoflow, the excess e(v) at a vertex v is $\Sigma\{f(u,v)|(u,v) \text{ is an arc}\}$. For example, in FIG. 1, the excess at vertex k, e(k), is the sum of the flows into vertex k, or sum of f(2,k) (flow from vertex 2 to vertex k), f(p,k), f(q,k), and f(i,k), less the flow out of vertex k, or the sum of f(k,3) and f(k,j). In other words, $e(k)=(f(2,k)+f(p,k)+f(q,k)+f(i,k))-(f(k,3)+f(k,j))$. A positive excess at vertex v means there is more flow into the vertex v than out of the vertex v. A pseudoflow is a "preflow" if e(v) is non-negative for every v other than s and t, and the pseudoflow is a flow if e(v) is zero for every v other than s and t. The value of a flow is e(t), which is the excess at target vertex t. A flow is "maximum" if it has maximum value over all possible flows. The maximum flow is a flow of maximum value from the source s to the sink t.

The computer 110 also includes an analysis software module 112 according to some embodiments that solves the problem of finding a minimum cut and/or a maximum flow (from source to sink) in a given network represented by the graph G. The analysis software module 112 is executable on one or more central processing units (CPUs) 108. As described in greater detail further below, an algorithm used by the analysis software module 112 according to some embodiments employs the pseudoflow concept noted above to determine the minimum cut and/or maximum flow.

A "cut" is a partition of the vertex set (V) (set of vertices in the graph G) into two parts, one containing s and the other containing t. A "source cut" is denoted by the set S of vertices in the part of the partition containing the source. An arc (v,w) with v but not w in S "crosses" the source cut S. The capacity of a source cut S is $\Sigma\{c(v,w)|(v,w)$ is an arc crossing S$\}$; in which c(v,w) represents the capacity of an arc (v, w). A cut is minimum if it has minimum capacity. The minimum cut problem is that of finding a minimum cut in a given network.

An example dashed line (dividing line) 120 in FIG. 1 illustrates a minimum cut. As depicted in FIG. 1, the dividing line 120 separates the source node 102 from the sink node 104. The dividing line 120 divides the nodes in the network into two sets, a first set (the source cut) that includes the source node 102, and a second set that includes the sink node 104. A minimum cut is a cut of minimum capacity; in other words, the sum of capacities of arcs crossing the cut is minimum.

The classic maximum-flow minimum-cut theorem states that the value of any flow is no greater than the capacity of any cut, and the value of a maximum flow equals the capacity of a minimum cut. Given a maximum flow, it is easy to find a minimum cut in time linear to the network size; however, a linear-time way to find a maximum flow given a minimum cut is not conventionally known.

The analysis software module 112 according to some embodiments uses an iterative algorithm to find a minimum cut and an extension to find a maximum flow of a capacitated network. The algorithm for finding a minimum cut maintains a pseudoflow in the network. In addition, the algorithm for finding a minimum cut uses a balancing loop that performs balancing moves between vertices of the network (characterized by a pseudoflow) until a stopping criterion is satisfied. The balancing loop causes a balanced pseudoflow (or substantially a balanced pseudoflow) to be derived from the pseudoflow.

The algorithm according to some embodiments maintains a pseudoflow and repeatedly attempts to balance the excesses at opposite ends of arcs. The algorithm can be completely local: there is no search for augmenting paths. The algorithm also does not have to maintain distance labeling, since the excesses by themselves provide sufficient information to determine where to move flow between vertices. A simple version of the algorithm according to some embodiments involves a single loop over the arcs that continues until a suitable stopping criterion holds. This version is frugal in its use of space as well as being simple. As a result, in some implementations, the algorithm is suitable for implementation in massively parallel systems.

Given a pseudoflow, the residual capacity of an arc (v,w) is r(v,w)=c(v,w)−f(v,w) (capacity of the arc less the flow on the arc). An arc (v,w) is saturated if r(v,w) is zero; otherwise, the arc is unsaturated or residual. A balanced pseudoflow is a pseudoflow satisfying the following property: for each arc (v, w), if e(v)>e(w), then r(v, w)=0, in other words, (v, w) is saturated. An arc (v,w) is active if the arc is unsaturated and e(v)>e(w) (the excess of vertex v is greater than the excess at vertex w); an active arc (v,w) is "α-active" for some positive α if $e(v) \geq e(w)+\alpha$. A cut is saturated if every arc crossing the cut is saturated. A flow is maximum and a cut is minimum if and only if the flow saturates every arc crossing the cut.

Figure 2:
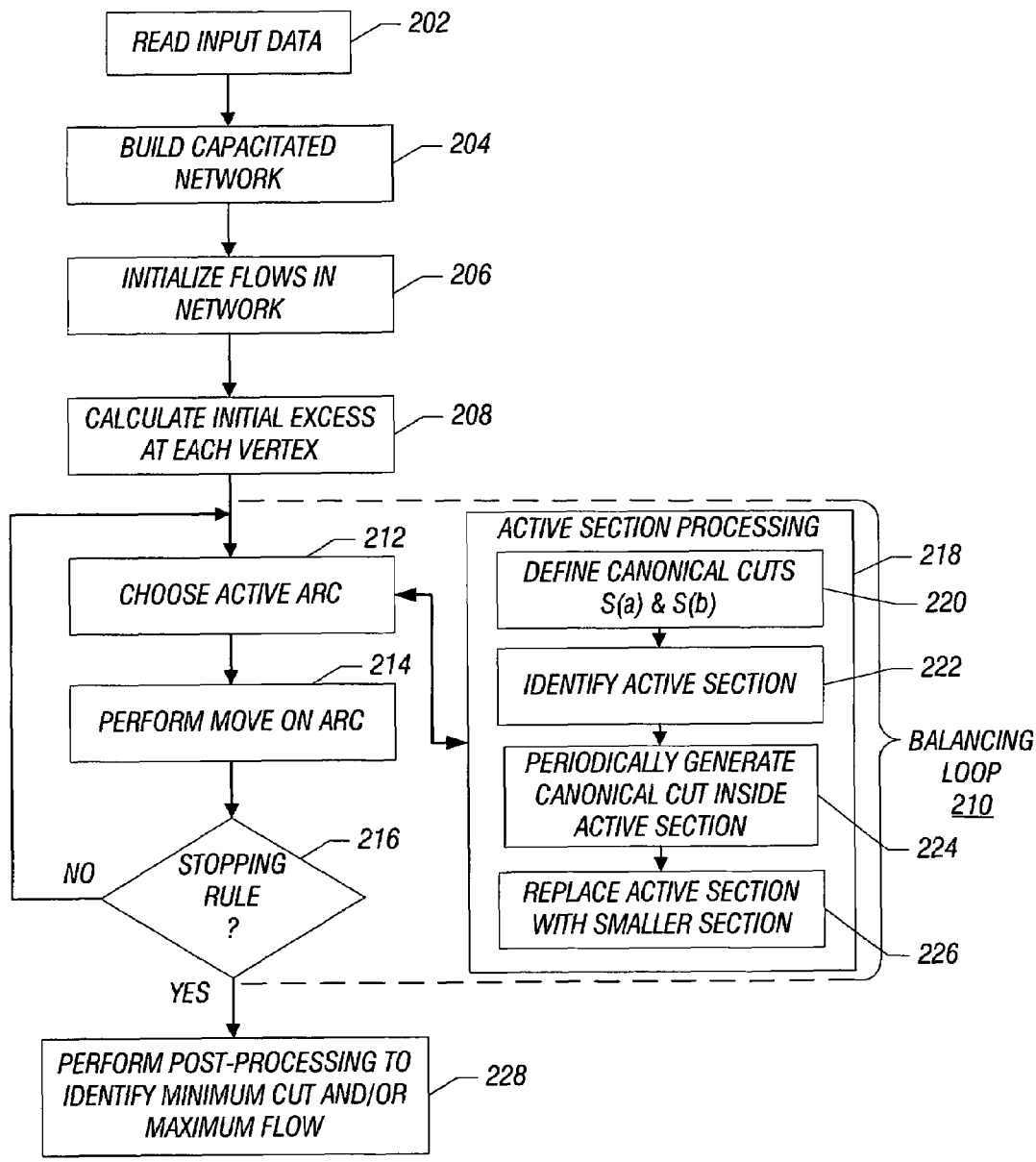
FIG. 2 is a flow diagram of a general process for tasks to enable identification of a minimum cut and/or a maximum flow in the network of FIG. 1, according to some embodiments.

FIG. 2 illustrates a process according to some embodiments performed by the analysis software module 112 (FIG. 1). The analysis software module 112 reads (at 202) input data related to a graph representing a network, which includes vertices, arcs, and capacities of the arcs. Based on the input data, the analysis software module 112 builds (at 204) a capacitated flow network, such as the flow network 100 depicted in FIG. 1. A representation of this capacitated flow network is stored.

Next, the flows in a network are initialized (at 206) such that an initial pseudoflow is provided. Note that some of the arcs may have zero flow. The analysis software module 112 then calculates (at 208) the initial excess at each vertex of the capacitated flow network. As part of the initialization to choose the initial pseudoflow, which can be a zero pseudoflow, source and sink dummy excesses of ∞ and −∞, respectively, can be assigned. Alternatively, the initialization can assign finite large values to the source and dummy excesses. Assigning large initial values to the source vertex (102) and the sink vertex (104) allows the flows of quantities to occur from vertices with large excesses to vertices with smaller excesses, over arcs that are unsaturated.

The movement of quantities from vertices with larger excesses to vertices with smaller excesses is iteratively performed in a balancing loop until no further moves can be made or until a stopping criterion has been satisfied. The balancing loop is represented as 210 in FIG. 2. In the balancing loop, an active arc is chosen (at 212), and Δ units of flow (quantities) are moved (at 214) across the chosen arc from vertex v to vertex w by increasing f(v,w) and e(w) by Δ and decreasing f(w,v) and e(v) by Δ, where $\Delta=\min\{r(v,w), (e(v)-e(w))/2\}$. The number of units of flow are represented by Δ, which is equal to the minimum of the residual capacity, r(v, w), and (e(v)−e(w))/2 (which is half of e(v) minus e(w)). In other words, the Δ units moved across the chosen arc cannot exceed the residual capacity left on the arc (v,w), and if sufficient residual capacity remains, the Δ units moved should be half of the excess difference between vertex v and vertex w. Note that the balancing loop can be performed using local information that relates to vertices involved in balancing moves, such as excess information of vertices v and w and residual information. Using local information to perform balancing moves is efficient in terms of storage used.

Effectively, the algorithm initially provides a pseudoflow in the network and, if residual capacities are left on arcs, the algorithm averages excesses across such arcs. A move on an arc (v,w) leaves $e(v) \geq e(w)$. The move either makes e(v) and e(w) equal, in which case the move is a balancing move, or the move saturates the arc (v,w), in which case the move is a saturating move. Note that a move can be both a balancing move and saturating move in some cases. A move on an α-active arc is referred to as an "α-move."

Without a stopping rule, the balancing loop 210 can potentially run forever (or at least for many iterations) without running out of active arcs. If the arc capacities are integers, a stopping rule (the first stopping rule) that works is to stop when there are no α-active arcs, for $\alpha=1/n^2$ (or any smaller value). Furthermore, in some implementations, moves can be restricted to α-moves. Also, the algorithm has to use just enough precision in computations so that a number no greater than $1/n^2$ is expressible. Another stopping rule (the second stopping rule) for the balancing loop 210 in the case of integer arc capacities is to stop when the sum of the positive excesses in an active section (defined below) is less than +1, or the sum of the negative excesses in the active section is greater than −1. As a special case, whenever the maximum excess of non-source vertices becomes non-positive or the minimum excess of non-sink vertices becomes non-negative, the balancing loop 210 can also stop. As long as the stopping rule is not satisfied, as determined at 216, the balancing loop 210 continues to iteratively select additional arcs on which to perform moves.

During the balancing loop 210, another task that is performed is active section processing (at 218). An active section is defined based on the concept of a "canonical cut." A "canonical cut" is a source cut $S(b)=\{v:e(v)>b\}$ for a real value b, where all arcs (v, w) with v but not w in S(b) are saturated (r(v, w)=0). Canonical cut S(b) contains vertices v with excesses e(v) greater than b. If the algorithm produces a saturated canonical cut S(b), then there would be no subsequent move on an arc crossing S(b). A section S(a,b) is a nonempty set of vertices S(a)-S(b) such that both S(a) and S(b) are canonical cuts. The section S(a,b) is considered an active section if $a<0 \leqq b$. In the balancing loop 210, the canonical cuts S(a) and S(b) are defined (at 220), and the active section S(a,b) is identified (at 222).

Figure 3:
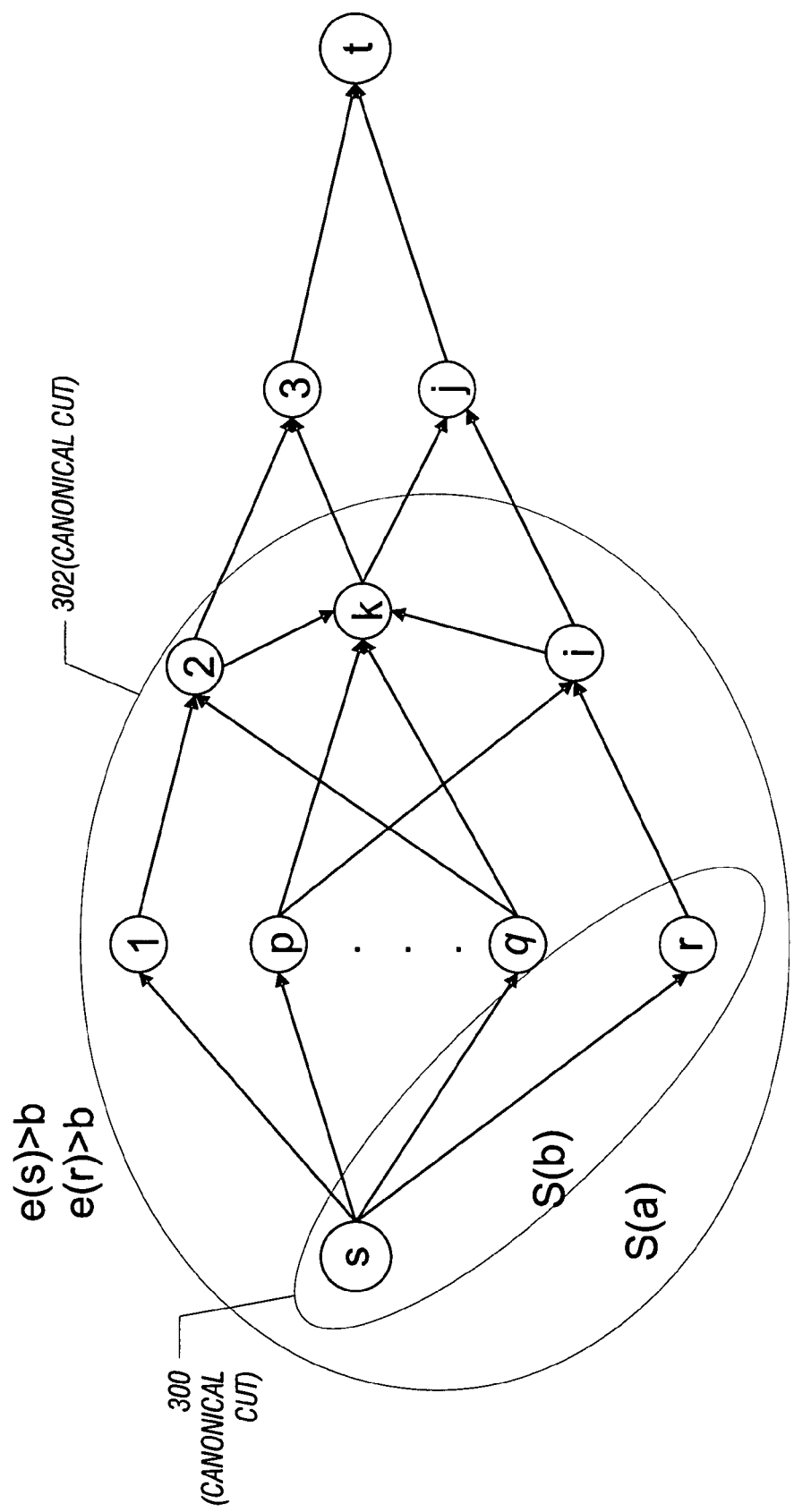
FIG. 3 illustrates a chart of a network in which canonical cuts have been identified, in accordance with an embodiment.

FIG. 3 depicts example canonical cuts S(a) and S(b) in the network 100 of FIG. 1. Note that the value of b is initially set at a relatively high value, and the value of a is set at a relatively low negative value. With a large value of b, the canonical cut S(b) initially is a singleton set {s} (a set containing only the source s), while the canonical cut S(a) may initially include all the vertices of the network except t. In FIG. 3, S(b) as represented by 300 includes vertex s and vertex r, each having an excess greater than b, whereas the canonical cut S(a) contains all the vertices within the oval 302 (including vertices s and r in cut S(b)). The vertices within the oval 302, but outside the oval 300, are vertices within the section S(a,b). Once the algorithm creates a section S(a,b), the maximum excess in the section cannot increase, the minimum excess in the section cannot decrease, and the "excess difference" in the section S(a,b), defined to be the maximum excess minus the minimum excess, cannot increase.

In particular, once the algorithm does a move (at 214) on each of the arcs incident to either vertex s or t, it produces a section S(a,b) containing all the vertices except vertices s and t. No additional moves ever take place on these arcs. If desired, the algorithm can be started by doing (saturating) moves on these arcs (incident on vertices s and t). Instead of ∞, the initial excess at the source (vertex s) can be set equal to any value that guarantees that the initial moves on arcs out of the source are saturating, namely at least the sum of the capacities of these arcs plus the largest of these capacities. Similarly, the initial excess of the sink can be set to any value no greater than minus the sum of the capacities of the arcs into the sink, minus the largest of these capacities. All moves across arcs take place within the active section S(a,b). The active section is defined as the minimal section S(a,b) such that a<0 and b≧0. It suffices to do moves only in the active section. By selecting vertices only in the active section for making moves across arcs, greater efficiency can be achieved since the number of vertices and arcs considered is reduced.

As the algorithm proceeds (moves at 214 in the balancing loop 210), the algorithm saturates more and more arcs in the active section S(a, b) and periodically generates (at 224) a new canonical cut S(c) with a<c<b. This leads to splitting the active section into two smaller sections and one of the new sections (either S(a, c) or S(c, b)) becomes the new active section. Specifically, the new active section is S(c, b) if c<0, otherwise if c≧0 then the new active section is S(a, c). In other words, the active section is replaced (at 226) with the smaller section S(a, c) or S(c, b) so that the size of the active section is reduced. In this manner, the active section is iteratively reduced in size.

In response to detecting saturated arcs crossing the canonical cuts S(a) and S(b) (which means that no further moves can be made across those arcs), the value b can be decreased and the value of a can be increased. Decreasing b and increasing a effectively reduces the size of S(a) and increases the size of S(b).

Once a stopping rule has been satisfied, as determined at 216, then post-processing is performed (at 228) to find the minimum cut. If when the balancing loop stops there are no further possible balancing moves in the flow network, then S(0) is a minimum cut. S(0) represents the set of vertices v where e(v)>0. However, if arc capacities are integers and one of the stopping rules given above is used, further analysis is performed to find a minimum cut, since additional balancing moves are still possible. The following discusses how to obtain the minimum cut when different stopping rules are used.

If the second stopping rule is used, then either the sum of positive excesses in the active section is less than +1, or the sum of negative excesses in the active section is greater than −1. For the first case where the sum of positive excesses in the active section S(a, b) is less than 1, then all nodes in the active section belong to the sink side of the cut, i.e., the source cut X=S(b). For the second case where the sum of negative excesses in the active section is more than −1, all nodes in the active section belong to the source side of the cut, i.e., the source cut X=S(a).

Figure 4:
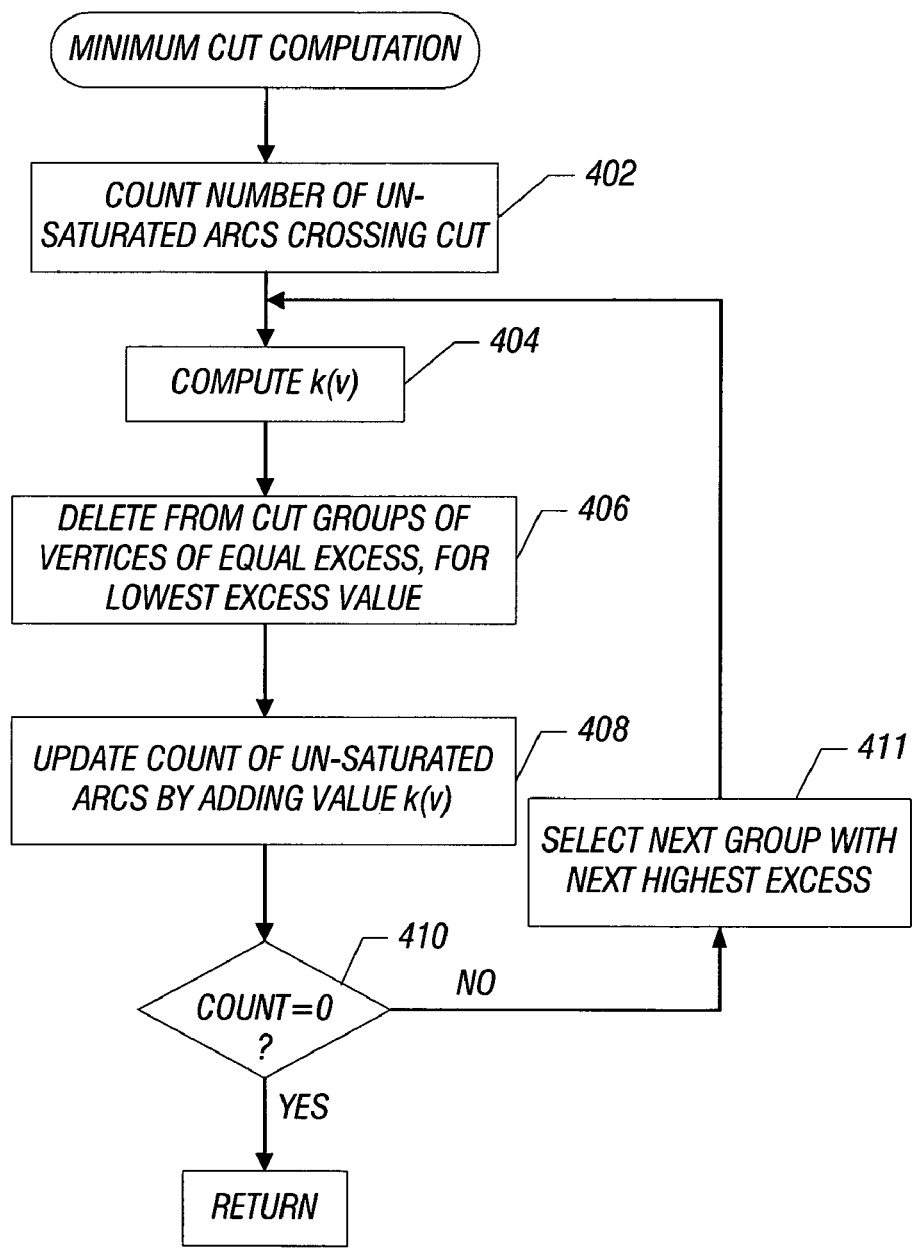
FIG. 4 is a flow diagram of a process of performing computing a minimum cut, according to an embodiment.

If the first stopping rule is used (there are no α-active arcs for $\alpha=1/n^2$), the following is performed. Computing the minimum cut is depicted in FIG. 4. Once the balancing loop 210 stops, the minimum cut is found by finding the cut S(b) such that b is a minimum non-negative real value and such that S(b) is saturated. The algorithm starts with $S(0)=\{v|e(v)>0\}$, where X=S(0) and Y=V−X. Y represents all vertices in set V not in X. Computing the minimum cut is performed by successively moving vertices from X to Y until no further unsaturated arcs cross the cut (X, Y), at which point the cut (X, Y) is the minimum cut. Cut (X, Y) represents the partition that divides V into X and Y.

The algorithm performed by the analysis software module 112 makes a pass over the arcs of the network or just arcs inside the active section, and attempts to find new canonical cuts based on a counting method. It counts (at 402) the number of unsaturated arcs crossing a cut (X, Y), where X is the side containing the source node. This number is referred to as COUNT.

The algorithm next computes (at 404) a number k(v) for each vertex v (inside the active section). The number k(v) is equal to the number of unsaturated arcs (u,v) with e(u)>e(v), minus the number of unsaturated arcs (v,w) with e(v)>e(w). Note that it is possible that k(v) is negative. For all vertices v, the vertices are sorted according to increasing excess values and the vertices are grouped into equal-excess value groups $G_1, \ldots, G_k$, where each group $G_i$ has vertices of equal excess value. The algorithm deletes (at 406) from X a group of one or more vertices v of equal excess, starting with the group associated with the lowest excess value. Deleting a vertex v from the side X means that the vertex v is moved from the side X in the network containing the source vertex to the side Y in the network containing the sink. The goal of the algorithm is to successively delete from the side X groups of vertices v of equal excess in increasing order by excess, until the number of unsaturated arcs crossing the cut (X, Y) is zero, which implies that a new canonical cut has been found and the algorithm can stop. The updated X is now X=S(b) where $b=e(G_i)$ and $e(G_i)$ being the excess value associated with group $G_i$.

Next, the algorithm updates (at 408) the count of the unsaturated arcs crossing the current cut X by adding the value k(v). The algorithm next determines (at 410) if the count (COUNT) of unsaturated arcs crossing the cut X is equal to zero. If not, then the next group (the group with the next higher excess value) is selected (at 411) and tasks at 404, 406, and 408 are repeated to move the next group of one or more vertices from X to Y. If the count of unsaturated arcs crossing X is equal to zero, as determined at 410, then the minimum cut, S(b) where b=e($G_i$), has been found and the algorithm can return. Note that the process of FIG. 4 will stop with a saturated cut (the minimum cut) at least by the time all vertices with excess less than +1 are deleted from X, assuming that the active section contains only vertices with excess less than +1.

In some implementations, the time involved in finding the minimum cut is O(m+k log n), where m represents the number of arcs in the network, k is the number of vertices deleted from X, and n is the number of vertices in the network.

In an alternative implementation, in which the stopping rule specifies that the algorithm stops when there is no available α-move, then the vertices to be considered for deletion from the cut X can be restricted to those with positive excess at most 1/n.

Figure 5:
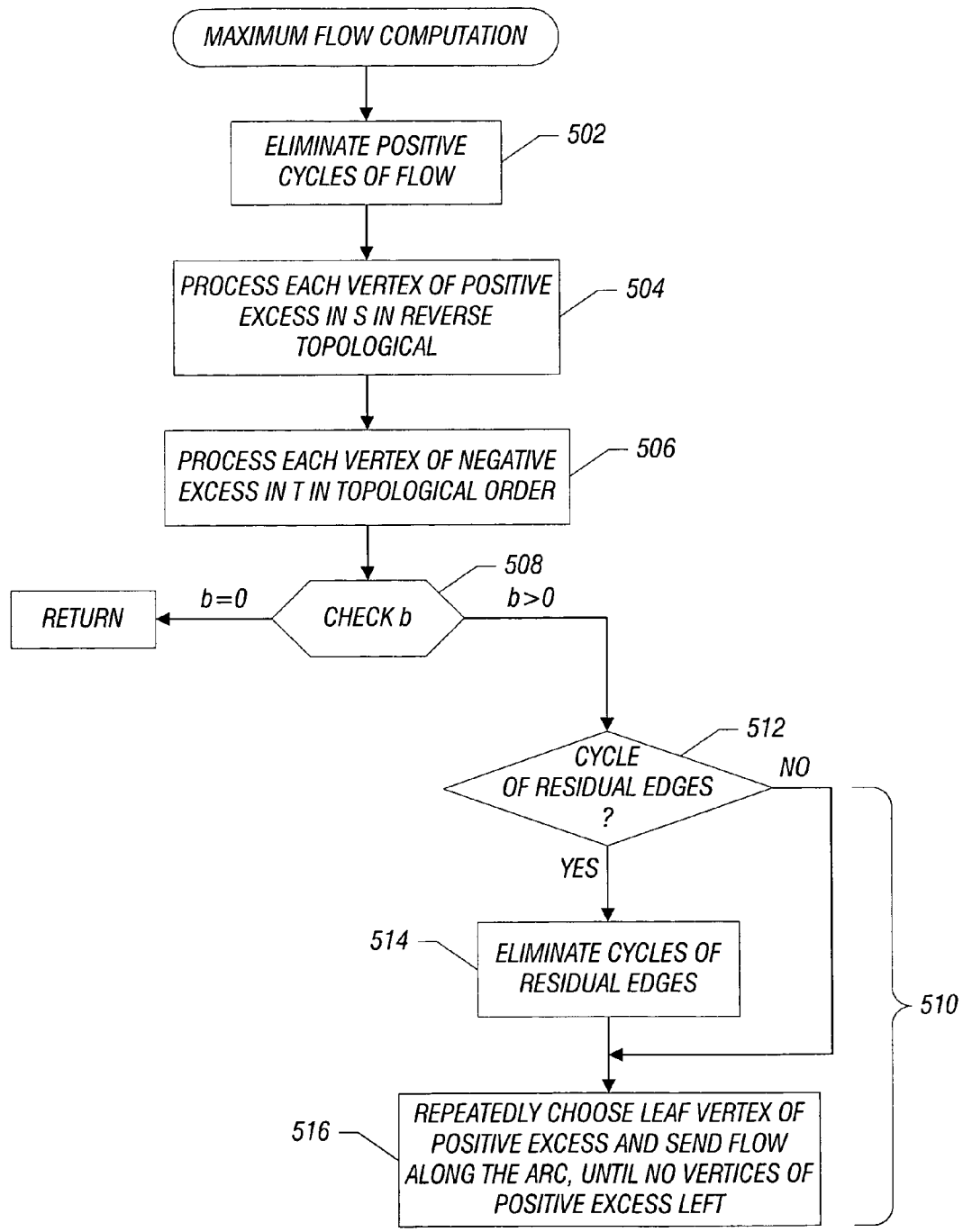
FIG. 5 is a flow diagram of a process of computing a maximum flow, in accordance with an embodiment.

Once the minimum cut has been found, the algorithm in some embodiments can proceed to find the maximum flow. FIG. 5 illustrates a process for finding the maximum flow, in accordance with some embodiments. Given a minimum cut S=S(b), the pseudoflow in the network is made acyclic by eliminating (at 502) positive cycles of the flow. A positive cycle of flow refers to a cycle that includes two or more vertices and arcs connecting to two or more vertices that cause flow to flow in a cycle (and hence cyclic flow is present in the network). One technique for eliminating positive cycles of flow is described in Daniel D. Sleator & Robert E. Tarjan, "A Data Structure for Dynamic Trees," Journal of Computer and Systems Sciences, 26(1):362-391 (1983).

Next, the algorithm processes (at 504) each vertex v of positive excess, e(v)>0, in the minimum cut S in reverse topological order. Reverse topological order in the minimum cut S refers to starting with the vertex v of positive excess that is furthest downstream of the source vertex s. The processing performed at 504 starts with this vertex v that is a positive excess that is furthest away from the source vertex, and proceeds backwards towards the source vertex to process each vertex of positive excess. Generally, reverse topological order refers to any order such that if (v,w) is an arc, vertex w precedes vertex v. The processing performed at 504 is as follows: the flow on successive arcs into vertex v is reduced until the excess, e(v), is reduced to zero.

Similarly, on the other side of the minimum cut, in the section T=V−S, each vertex of negative excess is processed (at 506) in topological order. In general, the topological order refers to any order such that if (v,w) is an arc, vertex v precedes vertex w. Note that the section T is the section that includes the sink vertex t. Processing of vertices having negative excess in T refers to beginning with the vertex of negative excess that is furthest upstream of the sink vertex. In the processing performed at 506, flow on successive arcs out of vertex v is increased until the excess, e(v), is increased to zero.

The computations performed at 502, 504, and 506 cause all positive excesses in the minimum cut S to be reduced to zero, and to eliminate all negative excesses in V−S(T), without changing the flow on any arc crossing the minimum cut S. The algorithm determines (at 508) if b is equal to zero. If so, then the pseudoflow is now a flow that saturates the cut S; as a result (implied by the maximum flow minimum cut theorem), the flow is a maximum flow and the cut S is a minimum cut.

However, if b>0, then further processing (at 510) has to be performed. Note that the sink-side section T may include positive excess vertices that have to be eliminated. To do so, the algorithm searches (at 512) for cycles of residual edges.

A "residual edge" is an edge {v,w} such that v and w are in T and f(v,w) is not an integer. If {v,w} is a residual edge, both (v,w) and (w,v) are unsaturated, since both c(v,w) and c(w,v) are integers. If v is a vertex of zero excess in T, v is incident either to zero or to at least two residual edges. If v is a vertex of positive excess in T, v is incident to at least one residual edge. If there is a cycle of residual edges, the algorithm eliminates (at 514) the cycle of residual edges. Each occurrence of a cycle of residual edges is eliminated. To eliminate a cycle of residual edges, the algorithm sends (increases or decreases) flow along the cycle (in either direction) to make at least one of the cycle's edges not residual, by making integral the flow on the corresponding pair of arcs. This will increase or decrease the flow on various arcs, but it creates no new residual edges. The technique of eliminating cycles of residual edges is similar to the technique described in Sleator & Tarjan, referenced above. Once there are no cycles of residual edges, the residual edges form a forest, every leaf of which is either the sink vertex t or a vertex of positive excess.

The algorithm repeatedly chooses (at 516) a leaf v of positive excess and sends flow along the arc corresponding to the incident residual edge. This will both reduce the excess to zero and eliminate the residual edge, and it preserves the property that the sum of positive excesses is less than +1. Task 516 is repeated until there are no vertices of positive excess. In some embodiments, the number of cycles and arcs along which flow must be moved in the further processing 510 is at most m.

The resulting maximum flow may still contain fractional flows on the source side S (the minimum cut). If desired, the flow can be converted into an integral flow by using the method in the further processing 510 to eliminate cycles of residual edges (and thereby all residual edges) on the source cut S. Making a flow integral refers to eliminating arcs having fractional flows.

The cut S(b) chosen by the algorithm for computing the maximum flow is such that S(a,b) is the active section. If the algorithm stops because the sum of the negative excesses in the active section is greater than −1, but the sum of positive excesses in the active section is greater than +1, then the cut S(a) is chosen instead, and the maximum flow computation is modified to eliminate the negative excesses in S(a).

The algorithm discussed above in connection with FIG. 2 is referred to as a "generic algorithm" since the algorithm does not specify the order of moves on the arcs of the network during the balancing loop 210. Once the generic algorithm reaches a state when there is no move available, by definition a balanced pseudoflow is obtained. The generic algorithm thus implies a generic algorithm for balanced pseudoflow computation. In an alternative embodiment, an order of moves can be specified using a round-robin technique. In the round-robin technique, a fixed list of arcs is specified, with the algorithm looping over the fixed list of arcs and applying a move to each active arc, until an entire pass over the arcs does no α-moves. The round-robin technique employs relatively small data structures such that storage space used is relatively small. The round-robin algorithm can be used to compute an (approximate) balanced pseudoflow, and with appropriate post processing (minimum cut and maximum flow computations if necessary), it can be converted to compute the ordinary maximum flow and minimum cut.

Two arrays are defined, where a first array has an entry for each pair of arcs (v,w) and (w,v), containing v, w, c(v,w), c(w,v), and f(v,w); and a second array has an entry for each vertex v, containing e(v). When visiting an entry for (v,w) and (w,v), the algorithm compares e(v) and e(w) and does a move from the larger- to the smaller-excess-vertex if the corresponding arc is unsaturated.

The round-robin algorithm is also well-suited for parallel implementation. If edges in the network are identified by colors so that no two edges of the same color share a vertex, then all edges of the same color can be processed concurrently.

Other variations of the generic algorithm can also be used. For example, in one variation, the vertices can be sorted by excess before every pass (or sorted periodically). A pass is performed by scanning the vertices in decreasing order by excess, looking at their incident arcs for possible moves. This variation employs an adjacency list representation of the network, rather than just a list of arcs. The excess difference for each arc can be tracked, and the move with the largest difference is performed.

As noted above, the generic algorithm focuses on the active section in making the moves such that moves are made in the active section and not in the remaining parts of the network. In another variation, it may be useful to periodically look for saturated canonical cuts, and to drop all arcs not in the active section from consideration when such a cut is found.

In yet another variation, arcs (v,w) on which moves are made can be restricted such that e(v)·e(w)≦0. Yet another possibility is to always perform a move from a vertex of maximum excess.

Alternative initializations of the network are also possible. For example, one initialization would saturate one of each pair of arcs (v,w) and (w,v). Also, another variation involves balancing over single arcs, such that excesses over larger sections can be balanced at once, such as over a vertex and all its neighbors, or over all vertices on a path, or over all vertices in a tree.

Instructions of software described above (including the analysis software module 112 in FIG. 1) are loaded for execution on a processor (e.g., CPU 108). The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   providing a representation of a network having vertices connected by arcs, wherein the network exhibits a pseudoflow;
   iteratively choosing, by a computer, arcs of the network on which to perform moves for balancing excesses of vertices until a stopping rule is satisfied;
   after the stopping rule is satisfied, performing, by the computer, further processing to identify at least one of a minimum cut and maximum flow; and
   identifying an active section in the network, wherein iteratively choosing the arcs is performed in the active section but not in a portion of the network outside the active section.

2. The method of claim 1, wherein balancing the excesses comprises balancing excesses between vertices by moving units of flow across respective arcs, wherein an excess of each particular vertex is equal to units of flow into the particular vertex less units of flow coming out of the particular vertex.

3. The method of claim 1, further comprising:
   for each chosen arc, moving Δ units of flow across the chosen arc, where Δ is a lesser of a residual capacity of the arc and an average of a difference between excesses of vertices connected by the chosen arc, wherein an excess of each particular vertex is equal to units of flow into the particular vertex less units of flow coming out of the particular vertex.

4. The method of claim 1, further comprising iteratively reducing the size of the active section.

5. The method of claim 4, wherein iteratively reducing the size of the active section comprises:
   generating a new canonical cut; and
   redefining the active section as a smaller active section based on the new canonical cut.

6. The method of claim 4, wherein the active section is defined as S(a)–S(b), where S(a) includes a set of vertices with excess values greater than a, S(b) includes a set of vertices with excess values greater than b, wherein a<b, and wherein S(a) and S(b) are canonical cuts.

7. The method of claim 6, wherein moves are applied on arcs in S(a)–S(b), wherein each of the canonical cuts is saturated if every arc crossing the canonical cut is saturated.

8. The method of claim 1, further comprising determining that the stopping rule has been satisfied, wherein the stopping rule comprises one of:
   (1) stopping when there are no α-active arcs, where α is a predefined value, and an α-active arc is an arc (u, v) where an excess of vertex u is greater than or equal to a sum of α plus an excess of vertex v;
   (2) stopping when a sum of positive excesses in an active section of the network is less than +1, or a sum of negative excesses in the active section is greater than −1; and
   (3) stopping when no further moves can be made in the network.

9. The method of claim 1, wherein iteratively choosing arcs on which to perform moves comprises:
   sorting vertices by excesses of the vertices, wherein an excess of each particular vertex is equal to units of flow into the particular vertex less units of flow coming out of the particular vertex; and
   scanning the vertices in a particular order by excess and looking at incident arcs to the vertices to choose arcs on which to perform moves.

10. The method of claim 1, wherein identifying the minimum cut comprises identifying a cut S(b) where b is a minimum non-negative value such that S(b) is saturated, where the cut S(b) contains vertices (v) with excesses e(v) greater than b, the method further comprising:

computing the maximum flow based on the minimum cut S(b).

11. The method of claim 10, wherein computing the maximum flow comprises:

for each vertex v in S(b) except a source s having a positive excess, e(v), reducing flow on successive arcs into the vertex v until the excess, e(v), is reduced to zero; and for each vertex u in a set T except a sink t having a negative excess, e(u), increasing flow on successive arcs out of vertex u until the excess, e(u), is increased to zero, wherein T includes all vertices in the network except S(b).

12. A method comprising:

providing a representation of a network having vertices connected by arcs, wherein the network exhibits a pseudoflow;

iteratively choosing, by a computer, arcs of the network on which to perform moves for balancing excesses of vertices until a stopping rule is satisfied; and after the stopping rule is satisfied, performing, by the computer, further processing to identify at least one of a minimum cut and maximum flow;

wherein performing the further processing to identify the minimum cut comprises:

initially defining X and Y, where X contains a set of vertices including a source vertex of the network, and Y contains a set of all vertices in the network not including X, wherein Y contains a sink vertex of the network; and successively moving vertices from X to Y to modify the cut until no unsaturated arcs cross the modified cut, wherein the number of unsaturated arcs crossing cut (X, Y) is zero.

13. The method of claim 12, further comprising:

grouping the vertices into groups, wherein each group has vertices of equal excess value;

starting with the group with the lowest excess value, successively moving groups of vertices from X to Y until the number of unsaturated arcs crossing X is zero.

14. The method of claim 13, further comprising:

counting the number of unsaturated arcs crossing X;

for all vertices v having excess values e(v) between a first value and a second value, computing a number k(v) that is equal to the number of unsaturated arcs (u, v) with e(u)>e(v), minus the number of unsaturated arcs (v, w) with e(v)>e(w); and updating a count of the number of unsaturated arcs crossing X by adding k(v).

15. Instructions on a computer-usable medium that when executed cause a computer to:

provide a representation of a network having vertices connected by arcs, wherein the network exhibits a pseudoflow; and perform a balancing loop to iteratively choose arcs of the network on which to perform moves across the arcs until a stopping rule is satisfied;

after the stopping rule is satisfied, perform further processing to identify at least one of a minimum cut and maximum flow; and identifying an active section in the network, wherein performing the balancing loop is performed in the active section such that arcs are not chosen from a portion of the network outside the active section in performing the balancing loop.

16. The instructions of claim 15, wherein identifying the minimum cut comprises identifying a cut S(b) where b is a minimum non-negative value such that S(b) is saturated, where the cut S(b) contains vertices (v) with excesses e(v) greater than b, the method further comprising:

computing the maximum flow based on the minimum cut S(b).

17. The instructions of claim 15, further comprising making the maximum flow integral by eliminating arcs having fractional flows.

18. A method comprising:

providing a representation of a network having vertices connected by arcs, wherein the network exhibits a pseudoflow;

iteratively choosing, by a computer, arcs of the network on which to perform moves across the arcs in an active section of the network to enable determination of at least one of a minimum cut and a maximum flow, wherein arcs in a portion of the network outside the active section are not chosen to perform moves; and iteratively reducing, by the computer, the size of the active section as the moves are made.

19. The method of claim 18, wherein iteratively choosing arcs on which to perform moves comprises using a round-robin technique to choose the arcs.

\* \* \* \* \*

UNITED STATES PATENT AND TRADEMARK OFFICE
CERTIFICATE OF CORRECTION

PATENT NO. : 7,680,641 B1
APPLICATION NO. : 11/450706
DATED : March 16, 2010
INVENTOR(S) : Robert E. Tarjan et al.

Page 1 of 1

It is certified that error appears in the above-identified patent and that said Letters Patent is hereby corrected as shown below:

In column 10, line 47, in Claim 8, delete "a-active" and insert -- α-active --, therefor.

Signed and Sealed this

Twenty-second Day of June, 2010

David J. Kappos
*Director of the United States Patent and Trademark Office*